(12) United States Patent
Tate et al.

(10) Patent No.: US 7,443,122 B2
(45) Date of Patent: Oct. 28, 2008

(54) ELECTRIC DRIVETRAIN THERMAL PROTECTION SYSTEM

(75) Inventors: William James Tate, Dunlap, IL (US); Robert Paul Bertsch, Edwards, IL (US); Bruce H. Hein, East Peoria, IL (US); Thuong Dao Anh Le, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/475,888

(22) Filed: Jun. 28, 2006

(65) Prior Publication Data

US 2008/0001564 A1 Jan. 3, 2008

(51) Int. Cl.
*H02P 7/00* (2006.01)
(52) U.S. Cl. .................... 318/434; 318/471; 318/473; 388/934
(58) Field of Classification Search ............... 318/434, 318/471, 473; 388/934
See application file for complete search history.

(56) References Cited

U.S. PATENT DOCUMENTS

| 3,527,991 | A | | 9/1970 | Sackin |
| 3,629,676 | A | | 12/1971 | Ephraim, Jr. et al. |
| 5,123,081 | A | * | 6/1992 | Bachman et al. ............ 388/815 |
| 6,339,310 | B1 | | 1/2002 | Sugiyama et al. |
| 6,590,299 | B2 | * | 7/2003 | Kuang et al. .............. 290/40 C |
| 2004/0046525 | A1 | | 3/2004 | Gale et al. |
| 2005/0132726 | A1 | | 6/2005 | Sasaki et al. |

FOREIGN PATENT DOCUMENTS

| DE | 19826677 | 12/1999 |
| GB | 1116055 | 6/1968 |

* cited by examiner

*Primary Examiner*—Lincoln Donovan
*Assistant Examiner*—Thai Dinh
(74) *Attorney, Agent, or Firm*—Finnegan, Henderson, Farabow, Garrett & Dunner

(57) ABSTRACT

An electric drivetrain for a mobile machine is disclosed. The electric drivetrain has at least one power consuming device, a sensor associated with the at least one power consuming device, and a controller in communication with the power consuming device and the sensor. The sensor is configured to generate a signal indicative of a temperature of the power consuming device. The controller is configured to limit a power consumption level of the at least one power consuming device to an amount corresponding to a value of the signal.

16 Claims, 2 Drawing Sheets

ELECTRIC DRIVETRAIN THERMAL PROTECTION SYSTEM

TECHNICAL FIELD

The present disclosure relates generally to a thermal protection system and, more particularly, to a thermal protection system for an electric drivetrain.

BACKGROUND

Electric machines such as, for example, motors and generators may be used to generate mechanical power in response to an electrical input or to generate electrical power in response to a mechanical input. Magnetic, resistive, and mechanical losses within the motors and generators during mechanical and electrical power generation can cause a build up of heat. One of the limitations on the power output of the electric machines may be a temperature within the electric machines. If the temperature within the electric machine exceeds an operating capacity of the machine, malfunction or even damage of the machine can occur.

One method of limiting malfunction and damage of an electric machine includes determining a temperature of the electric machine and altering operation of the machine in response to the determination. For example, U.S. Pat. No. 3,629,676 (the '676 patent) to Ephraim, Jr. et al. discloses a system for controlling the power output of a locomotive generator as a function of traction motor temperature. The system utilizes an electrical heater element connected in series with a traction motor. The heater generates an amount of heat, which is a function of the amount of current being supplied to the traction motor such that the operating temperature of the traction motor is simulated. A temperature sensitive resistance element senses the simulated temperature and is connected with a control circuit to vary the excitation and output power of the generator as a function of the sensed temperature. As the simulated temperature increases past a maximum temperature, excitation of the generator is limited to reduce the current to the traction motor and, thereby, the temperature of the traction motor.

Although the system of the '676 patent may adequately control motor temperature in a locomotive application, it may be problematic. In particular, because only motor temperature is simulated and sensed, other temperature sensitive components within the same system may be unprotected. Further, because the temperature is simulated rather than directly measured, there may be situations in which the simulated temperature deviates from actual motor temperature, thereby allowing the system to be unnecessarily limited or, conversely, insufficiently protected. In addition, because only generator output is limited in response to excessive simulated temperatures, the response of the system may be slow and, if power storage is available, the traction motors may continue to operate at excessive temperatures until the storage is depleted. This extended operation at elevated temperatures may cause malfunction and damage to the traction motors.

The disclosed electric drivetrain is directed to overcoming one or more of the problems set forth above.

SUMMARY OF THE INVENTION

In one aspect, the present disclosure is directed to an electric drivetrain. The electric drivetrain includes at least one power consuming device, a sensor associated with the at least one power consuming device, and a controller in communication with the power consuming device and the sensor. The sensor is configured to generate a signal indicative of a temperature of the power consuming device. The controller is configured to limit a power consumption level of the at least one power consuming device to an amount corresponding to a value of the signal.

In another aspect, the present disclosure is directed to a method of operating a drivetrain. The method includes consuming electrical power to produce a mechanical output. The method further includes sensing a temperature associated with the mechanical output production and generating a signal indicative of the temperature. The method also includes limiting the consumption of power to an amount corresponding to a value of the signal.

DETAILED DESCRIPTION

Figure 1:
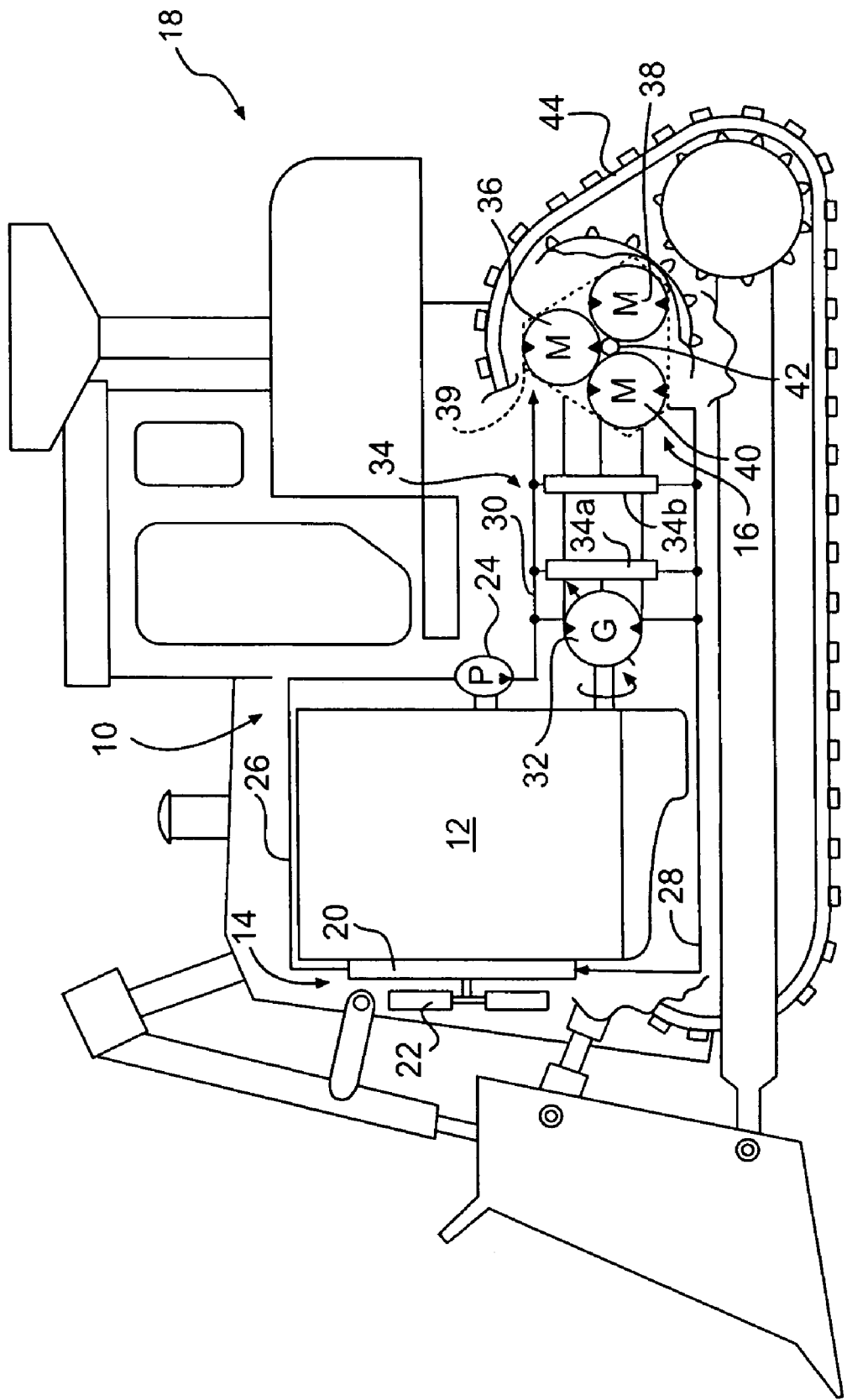
FIG. 1 is a diagrammatic illustration of an exemplary disclosed machine.

FIG. 1 illustrates an exemplary power system 10 having a power source 12, a cooling system 14, and an electric motor configuration 16. Power system 10 may form a portion of a mobile machine 18 such as, for example, a dozer, an articulated truck, an excavator, or any other mobile machine known in the art, with motor configuration 16 functioning as the main propulsion unit of machine 18. It is also contemplated that power system 10 may alternatively form a portion of a stationary machine such as a generator set, a pump, or any other suitable stationary machine.

Power source 12 may include a combustion engine operated to produce a rotational mechanical power output. For example, power source 12 may include a diesel engine, a gasoline engine, a gaseous fuel-powered engine, or any other type of combustion engine apparent to one skilled in the art. It is also contemplated that power source 12 may alternatively embody a non-combustion source of power such as a fuel cell, a battery, or any other suitable source.

Cooling system 14 may embody a pressurized system that transfers heat from power source 12 and/or motor configuration 16. Cooling system 14 may include, among other things, a heat exchanger 20, a fan 22, and a source 24 configured to pressurize and circulate a heat-transferring medium.

Heat exchanger 20 may embody a liquid-to-air heat exchanger used to transfer heat to or from the heat-transferring medium. For example, heat exchanger 20 may include a tube and fin-type heat exchanger, a tube and shell-type heat exchanger, a plate-type heat exchanger, or any other type of heat exchanger known in the art. Heat exchanger 20 may be connected to source 24 via a supply conduit 26, and to the components of motor configuration 16 via a return conduit 28. It is contemplated that heat exchanger 20 may function as the main radiator of power source 12, the engine oil cooler, the transmission oil cooler, the brake oil cooler, or any other cooling component of power source 12. It is further contemplated that heat exchanger 20 may alternatively be dedicated to conditioning only the heat-transferring medium supplied to motor configuration 16.

Fan 22 may be disposed proximal to heat exchanger 20 to produce a flow of air across heat exchanger 20 for liquid-to-air heat transfer. It is contemplated that fan 22 may be omitted or remotely located, if desired, and a secondary fluid circuit (not shown) may be connected to heat exchanger 20 to transfer heat to or from the heat-transferring medium via liquid-to-liquid heat transfer.

Source 24 may embody any device for pressurizing the heat-transferring medium within cooling system 14. For example, source 24 may include a fixed displacement pump, a variable displacement pump, a variable flow pump, or any other type of pump known in the art. Source 24 may be disposed between heat exchanger 20 and motor configuration 16, and driven hydraulically, mechanically, or electrically by power source 12. It is contemplated that source 24 may alternatively be located remotely from power source 12 and driven by a means other than power source 12. Source 24 may be connected to the components of motor configuration 16 by way of a supply conduit 30.

The heat-transferring medium may consist of a low-pressure fluid or a high-pressure fluid. Low-pressures fluids may include, for example, water, glycol, a water-glycol mixture, a blended air mixture, a power source oil such as transmission oil, engine oil, brake oil, diesel fuel, or any other low-pressure fluid known in the art for transferring heat. High-pressure fluids may include, for example, R-134, propane, nitrogen, helium, or any other high-pressure fluid known in the art.

Motor configuration 16 may be electrically coupled to power source 12 by way of a generator 32 and power electronics 34. In particular, generator 32 may be drivably connected to power source 12 via a flywheel (not shown), a spring or hydraulic coupling (not shown), a planetary gear arrangement (not shown), or in any other suitable manner. Generator 32 may be connected to power source 12 such that a mechanical output rotation of power source 12 results in a corresponding electrical output directed via power electronics 34 to motor configuration 16.

Power electronics 34 may include generator associated components and motor associated components. For example, power electronics 34 may include one or more inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating generator 32 and motor configuration 16. Other components that may be associated with the drive inverter may include power supply circuitry, signal conditioning circuitry, and solenoid driver circuitry, among others. In addition, power electronics 34 may include a generator heat sink 34*a* and a motor heat sink 34*b* in communication with return and supply conduits 28 and 30. Each heat sink 34*a, b* may be configured to absorb heat from their respective components of power electronics 34 and transfer this heat to the medium within cooling system 14.

Motor configuration 16 may include multiple components that interact to produce mechanical power in response to an electrical consumption. Specifically, motor configuration 16 may include a first motor 36, a second motor 38, and a third motor 40 disposed within a common housing 39 and operatively coupled to an output shaft 42. As electrical power is supplied from generator 32 to motor configuration 16, first, second, and third motors 36-40 may generate a torque applied through output shaft 42 at a range of rotational speeds. Output shaft 42 may be connected to a traction device 44 of machine 18, thereby propelling machine 18 in response to the applied torque.

Figure 2:
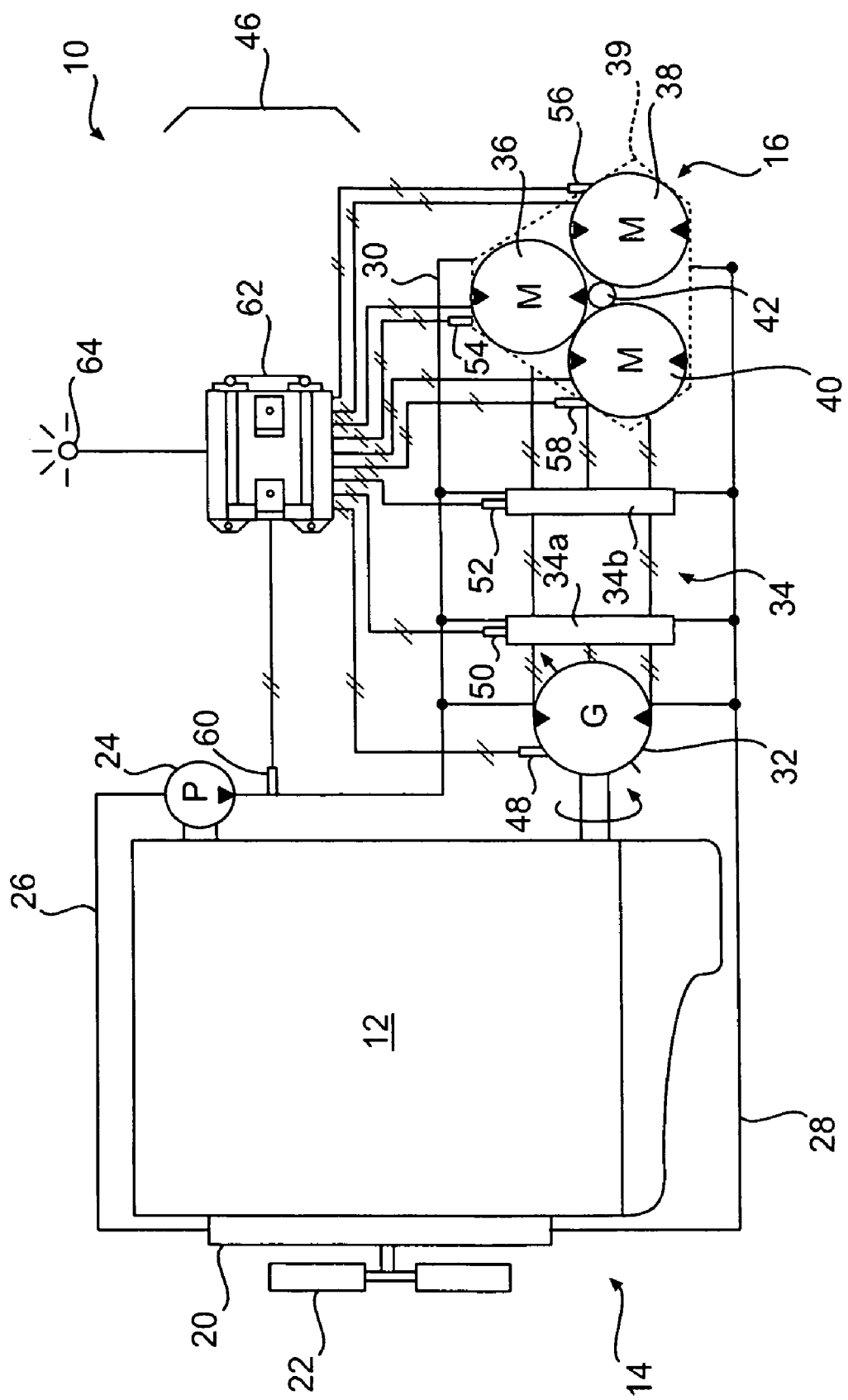
FIG. 2 is a diagrammatic illustration of an electric drivetrain for use with the machine of FIG. 1.

As illustrated in FIG. 2, power system 10 may also include a control system 46 having multiple components that interact to thermally protect power system 10. In particular, control system 46 may include a first sensor 48 associated with generator 32, a second sensor 50 associated with heat sink 34*a*, a third sensor 52 associated with heat sink 34*b*, a fourth sensor 54 associated with first motor 36, a fifth sensor 56 associated with second motor 38, a sixth sensor 58 associated with third motor 40, a seventh sensor 60 associated with the heat-transferring medium within cooling system 14, a warning lamp 64, and a controller 62 in communication with motors 36-40, sensors 48-60, and warning lamp 64. It is contemplated that sensors 54-58 may alternatively be combined into a single sensing device, if desired. Similarly, sensors 50 and 52 may be combined into a single device, if desired.

Sensors 48-60 may be configured to directly sense a temperature and/or collect information used to determine a temperature of the respective components and systems. For example, sensors 48-60 may embody surface or liquid-type sensors that directly measure the temperature of the power system components or the heat-transferring medium in contact with the components. Alternatively, sensors 48-60 may sense other parameters associated with operation of power system 10, the other parameters then being used to calculate or otherwise determine the temperature of the components or the heat-transferring medium in contact with the components. If sensors 48-60 are used to determine temperatures rather than directly measure the temperatures, sensors 48-60 may be located distal from their respective components of power system 10, if desired. Each of sensors 48-60 may generate a signal indicative of the sensed temperature or other measured parameter. These signals may be sent to controller 62 continuously, on a periodic basis, or only when prompted to do so by controller 62.

Controller 62 may embody a single microprocessor or multiple microprocessors that include a means for controlling an operation of power system 10. Numerous commercially available microprocessors can be configured to perform the functions of controller 62. It should be appreciated that controller 62 could readily embody a general machine, power system, or drivetrain microprocessor capable of controlling numerous machine functions. Controller 62 may include all the components required to run an application such as, for example, a memory, a secondary storage device, and a processor, such as a central processing unit or any other means known in the art for controlling power system 10. Various other known circuits may be associated with controller 62, including power supply circuitry, signal-conditioning circuitry, solenoid driver circuitry, communication circuitry, and other appropriate circuitry.

One or more maps relating temperatures and motor torque limits may be stored in the memory of controller 62. Each of these maps may be in the form of tables, graphs, and/or equations. In one example, a normalized temperature value derived from the signals of sensors 48, 54, 56, or 58 may form the coordinate axis of a 2-D table used for determining a maximum torque output command sent simultaneously to motors 36-40. In another example, a temperature value associated with the signal from heat sinks 34*a* or 34*b* may form the coordinates axis in another 2-D table used for determining the maximum torque output command sent to motors 36-40. In this manner, controller 62 may determine a torque limit of motors 36-40 that results in an appropriate and thermally protective power consumption level, and apply this limit simultaneously to motors 36-40.

INDUSTRIAL APPLICABILITY

The disclosed power system finds potential application in mobile vehicle or stationary system where it is desirable to limit the maximum operating temperature of an electric drivetrain in a controlled and uniform manner. The disclosed power system finds particular applicability in mobile machines. However, one skilled in the art will recognize that the disclosed power system could be utilized in relation to other configurations that may or may not be associated with a vehicle. The temperature limiting operation of power system 10 will now be described.

Referring to FIG. 1, when power system 10 is in operation, the heat-transferring medium, cooled by heat exchanger 20, may be pumped by source 24 through the components of power system 10. As the heat-transferring medium courses through the components of power system 10, heat may be continuously transferred to the medium. Upon exiting power system 10, the flow of the heat-transferring medium may be routed through heat exchanger 20 to expel heat to the atmospheric surroundings during a conditioning process.

In some situations, this transfer of heat away from power system 10 may be insufficient and, without intervention, the temperature of the components with power system 10 may still be able to reach excessive levels. Controller 62 may reduce the temperatures of the power system components by limiting an output of motors 36-40 in response to the signals from sensors 48-60. Specifically, in response to determining the presence of excessive temperatures, controller 62 may limit a torque output command directed to motors 36-40. By limiting the torque command of motors 36-40, the current consumed by motors 36-40 may also be limited. This limited current to motors 36-40 may subsequently result in lower current passing through power electronics 34 and less current being generated by generator 32. Lower currents may result in less heat generation and reduced temperatures.

Controller 62 may implement a specific algorithm to limit the torque command sent to motors 36-40. In particular, controller 62 may receive a temperature signal from each of motors 36-40 via sensors 54-58 and determine therefrom which of motors 36-40 is operating at the highest temperature. The highest temperature value associated with motors 36-40 may then be normalized relative to a maximum operating temperature threshold of motors 36-40 and retained within the memory of controller 62 for future comparison and control. Similarly, controller 62 may receive a temperature signal from generator 32 via sensor 48 and normalize the value of the generator temperature relative to a maximum operating temperature threshold of generator 32. The normalized motor temperature and normalized generator temperature may then be compared and the highest of these values referenced with the map stored within the memory of controller 62 to determine a first torque output command limit. It is contemplated that the temperature values received via sensors 48 and 54-58 may not require normalization, if the maximum operating temperatures of generator 32 and motors 36-40 are substantially the same.

Controller 62 may also consider the temperatures of heat sinks 34a and 34b when limiting the torque output of motors 36-40. Specifically, controller 62 may receive a temperature signal from each of heat sinks 34a, 34b via sensors 50, 52 and determine therefrom which of heat sinks 34a, 34b is operating at the highest temperature. The highest temperature value associated with heat sinks 34a, 34b may then be reference with the map stored within the memory of controller 62 to determine a second torque output command limit. Controller 62 may then compare the first and second torque output command limits and implement the greater of the limits. It is contemplated that, if the maximum operating temperatures of heat sinks 34a, 34b are different, the two temperature values received via sensors 50, 52 may first be normalized before comparison.

Controller 62 may also provide to an operator of machine 18, a warning indicating excessive temperatures within power system 10. Specifically, in response to the signal received via sensor 60 indicating a temperature of the heat-transferring medium in excess of a predetermined threshold value, controller 62 may warn the operator by illuminating warning lamp 64. It is contemplated that another indication of excessive temperatures may alternatively be provided to the operator such as, for example, an audible alarm, a message displayed across a monitor, or in another similar manner.

Because multiple different temperature input are utilized in the torque output control of motors 36-40, many, if not all, of the components of power system 10 may be thermally protected by controller 62. That is, because the temperatures of all of the major heat-generating components of power system 10 are monitored and continuously compared to their own respective maximum operating temperatures, the likelihood of thermally-induced malfunction or damage may be minimal. In addition, because these temperatures may be directly measured, the accuracy of the control process may be high in most all operational situations of machine 18, resulting in precise temperature control.

Because controller 62 manages the temperatures of power system 10 by limiting the torque output of motors 36-40, the temperature response of power system 10 may be high without undue limitation. Specifically, regardless of the amount of power storage available to motors 36-40, by limiting the torque output of motors 36-40, the current through all of the components of power system 10 may be quickly reduced. This reduction in current passing through the drivetrain components may directly relate to a reduction in temperature of those components.

It will be apparent to those skilled in the art that various modifications and variations can be made to the power system of the present disclosure. Other embodiments of the power system will be apparent to those skilled in the art from consideration of the specification and practice of the power system disclosed herein. It is intended that the specification and examples be considered as exemplary only, with a true scope of the disclosure being indicated by the following claims and their equivalents.

What is claimed is:

1. An electric drivetrain, comprising:
   at least one power consuming device;
   at least one power producing device;
   a sensor associated with the at least one power consuming device to generate a signal indicative of a temperature of the at least one power consuming device;
   a second sensor associated with the at least one power producing device to generate a second signal indicative of a temperature of the at least one power producing device; and
   a controller in communication with the at least one power consuming device, the sensor, and the second sensor, the controller being configured to:
   normalize the value of the signal;
   normalize the value of the second signal; and
   limit a power consumption level of the at least one power consuming device to an amount corresponding to the highest of the normalized value of the signal and the normalized value of the second signal.

2. The electric drivetrain of claim 1, wherein:
   the at least one power consuming device is a first power consuming device; and
   the electric drivetrain further includes:
   at least a second power consuming device; and
   a third sensor associated with the at least a second power consuming device to generate a third signal indicative of a temperature of the at least a second power consuming device, wherein the controller is in further communication with the at least a second power consuming device and the third sensor, the controller being configured to:
compare the values of the signal and the third signal;
normalize the value of the greater one of the signal and the third signal; and
simultaneously limit a power consumption level of the first power consuming device and the at least a second power consuming device to an amount corresponding to the highest of the normalized values.

3. The electric drivetrain of claim 1, further including:
at least one heat sink associated with at least one of the at least one power consuming device and the at least one power producing device; and
a third sensor associated with the at least one heat sink to generate a third signal indicative of a temperature of the at least one heat sink,
wherein the controller is in further communication with the third sensor and configured to:
determine a limitation on the power consumption level of the at least one power consuming device corresponding to the highest of the normalized values;
determine a limitation on the power consumption level of the at least one power consuming device corresponding to the value of the third signal; and
limit a power consumption level of the at least one power consuming device an amount corresponding to the greater of the determined limitations.

4. The electric drivetrain of claim 3, wherein:
the at least one heat sink is a first heat sink associated with the at least one power consuming device;
the electric drivetrain further includes:
a second heat sink associated with the at least one power producing device; and
a fourth sensor associated with the second heat sink to generate a fourth signal indicative of a fourth temperature of the second heat sink; and
the controller is further configured to:
compare the values of the third signal and the fourth signal; and
determined a limitation on the power consumption level of the at least one power consuming device corresponding to the highest value of the third and fourth signals.

5. The electric drivetrain of claim 1, wherein the at least one power producing device is configured to produce an electrical power output from a mechanical power input.

6. The electric drivetrain of claim 1, wherein the controller limits the power consumption level by limiting an output command directed to the at least one power consuming device.

7. The electric drivetrain of claim 6, wherein the controller includes a limit map stored in a memory thereof relating an output command and a drivetrain temperature value.

8. A method of operating a drivetrain, comprising:
producing an electrical power output;
consuming the electrical power output to produce a mechanical output;
sensing a temperature associated with the mechanical output production;
generating a signal indicative of the temperature;
utilizing a mechanical input to produce the electrical power output;
sensing a second temperature associated with the production of the electrical power output;
generating a second signal indicative of the second temperature;
normalizing the value of the signal;
normalizing the value of the second signal; and
limiting a consumption of power to an amount corresponding to the highest of the normalized value of the signal and the normalized value of the second signal, wherein limiting includes limiting an output command directed to an electrical motor.

9. The method of claim 8, further including:
consuming electrical power to produce a second mechanical output;
sensing a third temperature associated with the second mechanical output production;
generating a third signal indicative of the third temperature;
comparing the signal and the third signal;
normalizing the value of the greater one of the signal and the third signal; and
simultaneously limiting the consumption of power associated with the production of the mechanical output and the second mechanical output to an amount corresponding to the highest of the normalized values.

10. The method of claim 8, further including:
absorbing heat associated with at least one of the mechanical output production and the electrical power output production;
sensing a third temperature of the absorbed heat;
generating a third signal indicative of the third temperature;
determining a limitation on the consumption of power associated with the mechanical output production corresponding with the highest of the normalized values;
determining a limitation on the consumption of power associated with the mechanical output production corresponding to the value of the third signal; and
limiting a power consumption level of the mechanical output production corresponding to the greater of the determined limitations.

11. The method of claim 10, wherein:
absorbing heat includes absorbing heat associated with both of the mechanical output production and the electrical power output production;
sensing the third temperature includes sensing a temperature of the absorbed heat associated with the mechanical output production; and
the method further includes:
sensing a fourth temperature associated with the electrical power output production;
generating a fourth signal indicative of the fourth temperature;
comparing the values of the third and fourth signals; and
determining a limitation on the consumption of power associated with the mechanical output production corresponding to the highest of value of the third and fourth signals.

12. A mobile machine, comprising:
an engine;
a generator mechanically driven by the engine to generate electrical power;
at least one traction device;
at least one motor configured to consume the electrical power and drive the at least one traction device;
at least one heat sink associated with at least one of the at least one motor and the generator to absorb heat from the at least one of the at least one motor and the generator;
a first sensor associated with the generator to generate a first signal indicative of the generator temperature;

a second sensor associated with the at least one motor to generate a second signal indicative of the temperature of the at least one motor;
a third sensor associated with the at least one heat sink to generate a signal indicative of the temperature of the at least one heat sink; and
a controller in communication with the at least one motor, first sensor, second sensor, and third sensor, the controller being configured to:
normalize the value of the first signal;
normalize the value of the second signal;
determine a limitation on the power consumption level of the at least one motor corresponding to the highest of the normalized values;
determine a limitation on the power consumption level of the at least one motor corresponding to the third signal; and
limit a power consumption level of the at least one power consuming device an amount corresponding to the greater of the determined limitations.

13. The mobile machine of claim 12, wherein the controller limits the power consumption level by limiting an output torque command directed to the at least one motor.

14. The mobile machine of claim 12, wherein:
the at least one motor is a first motor; and
the machine further includes:
a second motor configured to consume the electrical power and drive the at least one traction device;
a third motor configured to consume the electrical power and drive the at least one traction device;
a fourth sensor associated with the second motor to generate a fourth signal indicative of a temperature of the second motor; and
a fifth sensor associated with the third motor to generate a fifth signal indicative of a temperature of the fifth motor,
wherein the controller is in further communication with the second motor, third motor, fourth sensor, and fifth sensor, the controller being configured to:
compare the values of the second signal, fourth signal, and fifth signal;
normalize the value of the greater one of the second, fourth, and fifth signals; and
simultaneously limit a power consumption level of the first, second, and third motors an amount corresponding to the greater of the determined limitations.

15. The mobile machine of claim 12, wherein:
the at least one heat sink is a first heat sink associated with the generator;
the machine further includes:
a second heat sink associated with the at least one motor; and
a fourth sensor associated with the second heat sink to generate a fourth signal indicative of a fourth temperature of the second heat sink; and
the controller is further configured to:
compare the values of the third and fourth signals; and
determined a limitation on the power consumption level of the at least one motor corresponding to the highest value of the third and fourth signals.

16. The mobile machine of claim 12, further including:
a cooling system configured to direct fluid through the generator, at least one motor, and at least one heat sink; and
a fourth sensor associated with the cooling system to generate a fourth signal indicative of a temperature of the fluid,
wherein the controller is in further communication with the fourth sensor and configured to provide a warning to an operator of the machine in response to a temperature of the fluid exceeding a predetermined value.

* * * * *